US006983099B2

(12) United States Patent  
Tanaka et al.

(10) Patent No.: US 6,983,099 B2
(45) Date of Patent: Jan. 3, 2006

(54) INFORMATION REPRODUCING APPARATUS, IMAGE DISPLAY CONTROL METHOD, AND RECORDING MEDIUM

(75) Inventors: Hiroki Tanaka, Tokyo (JP); Katsuhiro Sugiyama, Chiba (JP)

(73) Assignee: Sony Corporation, (JP)

( * ) Notice: Subject to any disclaimer, the term of this patent is extended or adjusted under 35 U.S.C. 154(b) by 1098 days.

(21) Appl. No.: 09/808,852

(22) Filed: Mar. 15, 2001

(65) Prior Publication Data

US 2001/0022890 A1    Sep. 20, 2001

(30) Foreign Application Priority Data

Mar. 17, 2000 (JP) ............... P2000-075643

(51) Int. Cl.
   *H04N 5/93* (2006.01)
(52) U.S. Cl. ............ 386/52; 386/125; 360/13
(58) Field of Classification Search .......... 386/52, 386/55; 360/13; 369/83; 715/723–726
   See application file for complete search history.

(56) References Cited

U.S. PATENT DOCUMENTS

| 4,774,600 A | | 9/1988 | Baumeister |
| 5,760,767 A | * | 6/1998 | Shore et al. ............. 715/723 |
| 5,911,030 A | * | 6/1999 | Kikuchi et al. .......... 386/55 |
| 5,953,481 A | | 9/1999 | Watanabe et al. |
| 5,999,173 A | * | 12/1999 | Ubillos ..................... 715/724 |
| 6,064,793 A | * | 5/2000 | Furuyama ................. 386/52 |
| 6,763,177 B1 | * | 7/2004 | Abe et al. ................. 386/55 |

FOREIGN PATENT DOCUMENTS

EP    0 764 951 A1    3/1997

\* cited by examiner

*Primary Examiner*—James J. Groody
*Assistant Examiner*—Christopher Onuaku
(74) *Attorney, Agent, or Firm*—Lerner, David, Littenberg, Krumholz & Mentlik, LLP (57) ABSTRACT

An information reproducing apparatus includes a device operable to reproduce image signals recorded on a recording medium; a unit operable to set at least one image signal start point and end point for editing the recorded image signals; a storage device operable to store the image signal start points and end points thus set; and a controller operable to control the display of marks corresponding to the stored image signal start points and end points. The controller controls the display in such a manner as to display marks corresponding in number to the stored start and end points. The controller also controls the display so that the marks corresponding to the stored start and end points are displayed in a color different from the color of the marks corresponding to the start and end points not yet stored, and so that the marks corresponding to the start and end points already reproduced are displayed in a color different from the color of the marks corresponding to the start and end points not yet reproduced.

12 Claims, 8 Drawing Sheets

INFORMATION REPRODUCING APPARATUS, IMAGE DISPLAY CONTROL METHOD, AND RECORDING MEDIUM

CROSS-REFERENCE TO RELATED APPLICATIONS

This application claims priority from Japanese Application No. 2000-075643 filed Mar. 17, 2000, the disclosure of which is hereby incorporated by reference herein.

BACKGROUND OF THE INVENTION

The present invention relates to an information reproducing apparatus, an image display control method and a recording medium, and more particularly to those adapted for facilitating video data editing by displaying marks that indicate start (IN) points and end (OUT) points of video data to be edited.

Recently, digital appliances such as personal computers, digital video cameras and so forth have become widely used. With the development of such devices, it has become possible to simply record output data of a digital video camera on a digital video tape loaded in a DVTR (Digital Video Tape Recorder), or to edit image data which has already been recorded on a digital video tape, depending on the choice of the user. It has further become possible to dub such edited data onto another recording medium.

However, in such a DVTR, it has been customary heretofore that, during the time the user is carrying out an editing process while viewing the video images displayed on a screen, the screen is full of displayed items including index information (e.g., time stamps representing date, time, minute, second and frame) and other setting information for expediting the editing process. Consequently, it is difficult to view the images due to the index information and the setting information being displayed on the entire screen, with the result that the editing process is impeded.

SUMMARY OF THE INVENTION

It is therefore an object of the present invention to facilitate a video data editing process by displaying marks that indicate start (IN) points and end (OUT) points of the video data to be edited.

According to one aspect of the present invention, there is provided an information reproducing apparatus which includes a reproducing device operable to reproduce image signals recorded on a recording medium; a setting unit operable to set at least one start point and end point for editing the recorded image signals; a storage device operable to store the at least one image signal start point and end point set by the setting unit; and a controller operable to control the display of marks corresponding to the stored image signal start points and end points.

Where the storage device is capable of storing a selected number of image signal start points and end points, the controller is operable to control the display of marks so that marks corresponding in number to the selected number are displayed.

Further, where the selected number of image signal start points and end points includes the stored image signal start points and end points and unstored image signal start points and end points, the controller is operable to control the display of marks so that the marks corresponding to the stored image signal start points and end points are displayed in a first color, and marks corresponding to the unstored image signal start points and end points are displayed in a color different from the first color.

Moreover, the controller is operable to control the display of marks so that ones of the marks corresponding to the stored image signal start points and end points representing the recorded image signals which have been reproduced by the reproducing device are displayed in a first color, and others of the marks corresponding to the stored image signal start points and end points representing the recorded image signals which have not yet been reproduced by the recording device are displayed in a color different from the first color.

According to another aspect of the present invention, there is provided an image display control method. The method includes reproducing image signals recorded on a recording medium; setting at least one image signal start point and end point for editing the recorded image signals; storing the at least one image signal start point and end point; and displaying marks corresponding to the stored image signal start points and end points.

And according to a further aspect of the present invention, there is provided a storage medium recorded with a program readable by a computer. The program executes a processing routine including reproducing image signals recorded on a recording medium; setting at least one image signal start point and end point for editing the recorded image signals; storing the at least one image signal start point and end point; and displaying marks corresponding to the stored image signal start points and end points.

In the information reproducing apparatus, the image display control method and the program recorded on the storage medium in accordance with the present invention, the image signals recorded on the recording medium are reproduced therefrom, and one or more start points and end points for editing the recorded image signals are set. The one or more image signal start points and end points thus set are then stored, and marks corresponding to the stored image signal start points and end points are displayed, whereby the user is able to perform a video data editing process quickly and easily.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1:
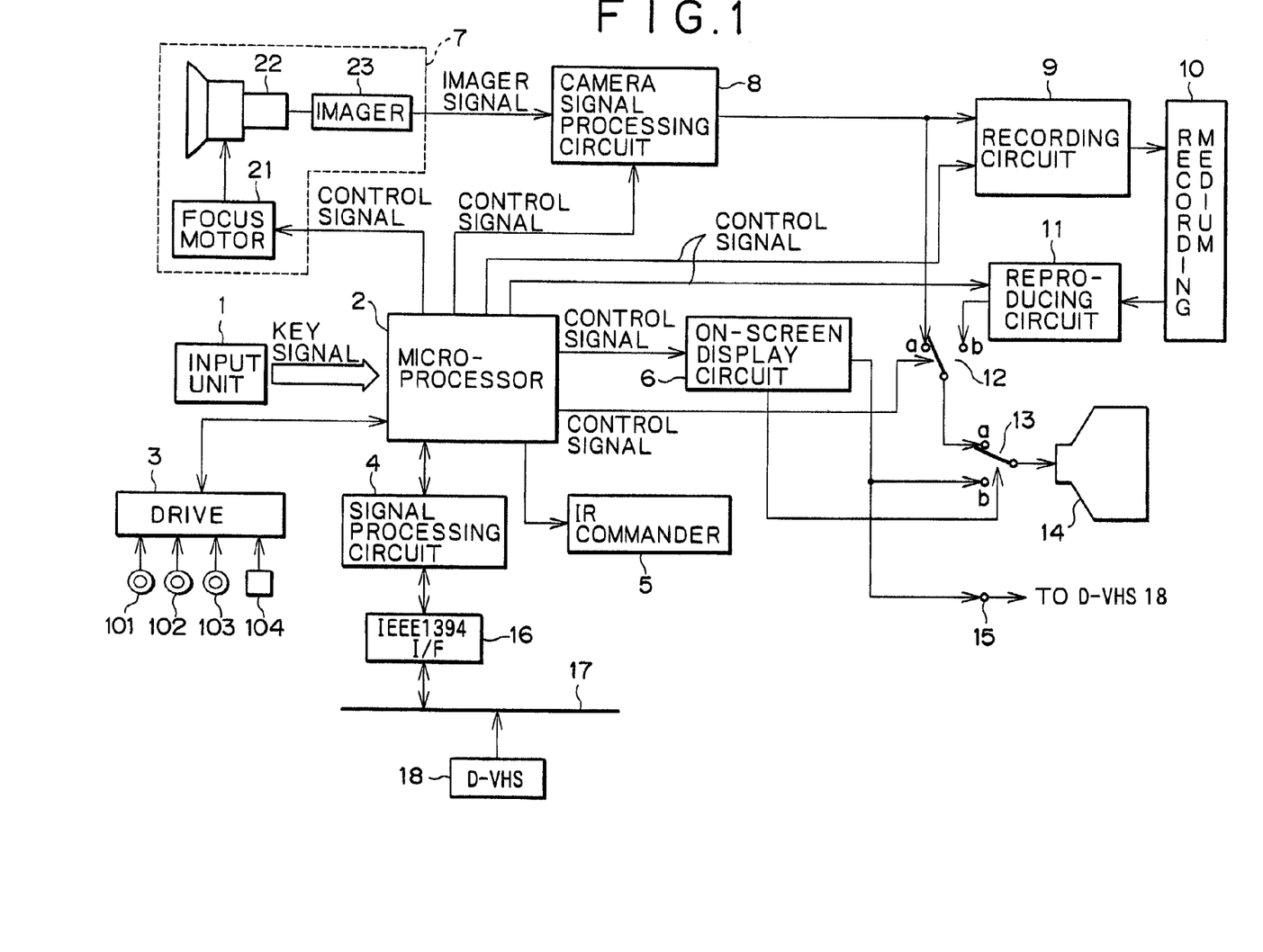
FIG. 1 is a block diagram showing a structural example of a digital video tape recorder (DVTR) with an internal camera where the present invention is applied.

FIG. 1 is a block diagram showing a structural example of a digital video tape recorder (DVTR) with an internal camera where the present invention is applied. An input unit 1 consists of a keyboard, a mouse, buttons, switches and so forth. Upon manipulation by a user, a key signal corresponding to such manipulation is input to a microprocessor 2.

The microprocessor 2 generates a control signal in response to the key signal received from the input unit 1 so as to control each component circuit. Further, in response to the key signal from the input unit 1, the microprocessor 2 stores, in a buffer memory, program information representing an IN (start) point and an OUT (end) point of video data to be edited, or reads such IN and OUT points of the program information stored in the buffer memory.

The microprocessor 2 further issues a command to control a D-VHS 18 (Digital-Video Home System) (trade name) in accordance with the program information read out from the buffer memory, and then outputs the command to either a signal processing circuit 4 or an IR (Infrared Radiation) commander 5 by changing an internal output switch. A drive 3 is connected to the microprocessor 2, and a magnetic disk 101, an optical disk 102, a magneto-optical disk 103 or a semiconductor memory 104 can be loaded in the drive 3.

The signal processing circuit 4 packetizes an AV/C (Audio Video/Control) command supplied thereto from the microprocessor 2 for controlling the D-VHS 18, and transmits the packet data to the D-VHS 18 via an IEEE (The Institute of Electrical and Electronics Engineers) 1394 interface (IF) 16 and an IEEE 1394 serial bus 17.

The IR commander 5 conforms with SIRCS (Standard Code for Infrared Remote Control System), for example, and, in response to a remote control command supplied thereto from the microprocessor 2 for controlling the D-VHS 18, outputs a corresponding infrared signal (IR signal) from an infrared-ray emitter (not shown) to a light sensor (not shown) of the D-VHS 18.

An on-screen display circuit 6 converts text information into corresponding image data in response to a control signal supplied from the microprocessor 2, and then supplies the image data to the terminal b of a switch 13 or to a line output terminal 15.

A video camera 7 comprises a focus motor 21, a display 22 and an imager 23. The focus motor 21 functions in response to a control signal supplied from the microprocessor 2, and drives the imager 23 in a manner to pick up the image displayed on the display 22. The imager 23 consists of a lens system and a CCD (Charge Coupled Device), for example, and supplies an imager signal (pickup signal) to a camera signal processing circuit 8.

The camera signal processing circuit 8 executes analog-to-digital conversion of the imager signal supplied from the imager 23, in response to a control signal from the microprocessor 2, to thereby generate video (image) data, and then supplies such data to a recording circuit 9.

Subsequently, in response to a control signal supplied from the microprocessor 2, the recording circuit 9 encodes with compression the video data from the camera signal processing circuit 8 in conformity with a predetermined format such as, e.g., the MPEG (Moving Picture Experts Group) format and, after executing error correction, modulation and so forth of the signal, records the processed signal on a recording medium 10. The recording medium 10 consists of a digital video tape, for example.

A reproducing circuit 11 reads out the recorded video data from the recording medium 10 and executes predetermined processes of demodulation, error correction, decoding and digital-to-analog conversion of the reproduced signal to thereby generate a video signal, and then outputs the video signal to a viewfinder LCD (Liquid Crystal Display) panel 14 via the terminal b of a switch 12 and the terminal a of a switch 13.

When the video data from the camera signal processing circuit 8 is to be output to the LCD panel 14 via the switch 13, the switch 12 is so changed as to select the terminal a in response to a control signal supplied from the microprocessor 2. And when the video data from the reproducing circuit 11 is to be output to the LCD panel 14 via the switch 13, the switch 12 is so changed as to select the terminal b.

When the video data is to be output to the LCD panel 14, the switch 13 is so changed as to select the terminal a in response to a command from the on-screen display circuit 6 controlled by the microprocessor 2. Meanwhile, when the image data corresponding to the text information and so forth from the on-screen display circuit 6 is to be output to the LCD panel 14, the switch 13 is so changed as to select the terminal b.

The LCD panel 14 reproduces the video data input via the switches 12 and 13, or reproduces the image data corresponding to the text information and so forth input via the on-screen display circuit 6 and the switch 13. The information of a frame counter obtained from the on-screen display circuit 6 is output to the D-VHS 18 via a line output terminal 15.

The D-VHS 18 is connected to the DVTR via an AV cable (not shown) or the IEEE 1394 serial bus 17, and records the video data on the loaded D-VHS tape in accordance with the commands output from the DVTR. (A specific example thereof will be described later.) The D-VHS 18 further records the frame counter information, which is input from the DVTR, on the D-VHS tape.

Now a fundamental operation of the DVTR shown in FIG. 1 will be explained below.

In recording, the imager 23 of the video camera 7 picks up the image being displayed on the display 22 and supplies the image signal to the camera signal processing circuit 8. Then the camera signal processing circuit 8 executes analog-to-digital conversion and so forth of the imager signal obtained from the digital video camera 7, and supplies the processed video data to the recording circuit 9. Subsequently, the recording circuit 9 executes predetermined record signal processes with regard to the video data from the camera signal processing circuit 8 and records the processed data on the recording medium 10. At this time, an edit mode is set for the video data so that the relevant video data can be identified as those adapted for editing (i.e., PICT_INDE_EDIT is attached to the top of the video data).

And in reproduction, the reproducing circuit 11 reads out the video data (where an edit mode is set) recorded on the recording medium 10, and after execution of predetermined signal processing (demodulation, error correction, decoding and digital-to-analog conversion), the circuit 11 outputs the processed data to the LCD panel 14 via terminal b of the switch 12 and terminal a of the switch 13, thereby reproducing the picture.

Referring to the picture reproduced on the LCD panel 14, the user sets program information (IN point and OUT point of the video data) to be used for editing. The microprocessor 2 stores the program information in the buffer memory in response to a command (setting of the program information) from the user. As a user starts the editing process, the microprocessor 2 records, in accordance with the program information stored in the buffer memory, the edited video data on a D-VHS tape (not shown), which is loaded in the D-VHS 18, via an AV cable.

Next, with reference to program edit screens shown in FIGS. 2 to 5, an explanation will be given on the process of setting the program information (IN point and OUT point) of the video data to be used for editing. It is assumed here that video data, where an edit mode is set as 1 minute, 40 seconds and 5 frames (hereinafter expressed simply as 0:01:40:05), is recorded on the recording medium 10. Upon reception of a command from the user to indicate reproduction of the video data, the video data is read out from the recording medium 10, and then is output to the LCD panel 14 via the reproducing circuit 11, terminal b of the switch 12 and terminal a of the switch 13, whereby the video data is reproduced.

Figure 2:
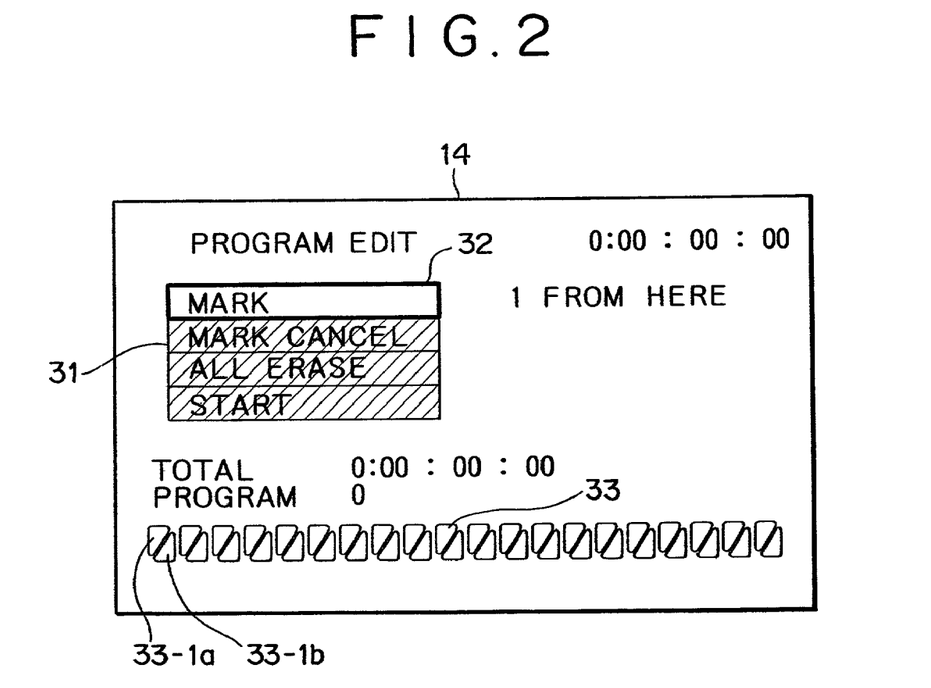
FIGS. 2 to 8 are explanatory diagrams showing some examples of program edit screens.

The example of FIG. 2 represents a program edit screen displayed immediately after reproduction of the video data recorded on the recording medium 10. In this example, where the program information has not yet been set by the user, "Mark" of the edit mode in an edit mode display area 31 is selectable, but "Mark cancel", "All erase" and "Start" are unavailable for selection. In this case, a cursor 32 can be positioned on "Mark" only.

A mark group 33 consists of a certain number of marks (e.g., 20) corresponding to programs settable at once, and the marks are displayed in white. As the user sets program information, the corresponding mark is displayed in blue. For example, when an IN point for program 1 has been set, a mark 33-1a is displayed in blue. And when an OUT point for program 1 has been set, a mark 33-1b is displayed in blue. In the example of FIG. 2 where no program information has been set, all the marks are displayed in white.

The total time (0:00:00:00 in this case) of a program (0 in this case) is displayed on the program edit screen shown in FIG. 2, and further "1 From here" is displayed thereon, hence prompting the user to set an IN point for program 1.

Figure 3:
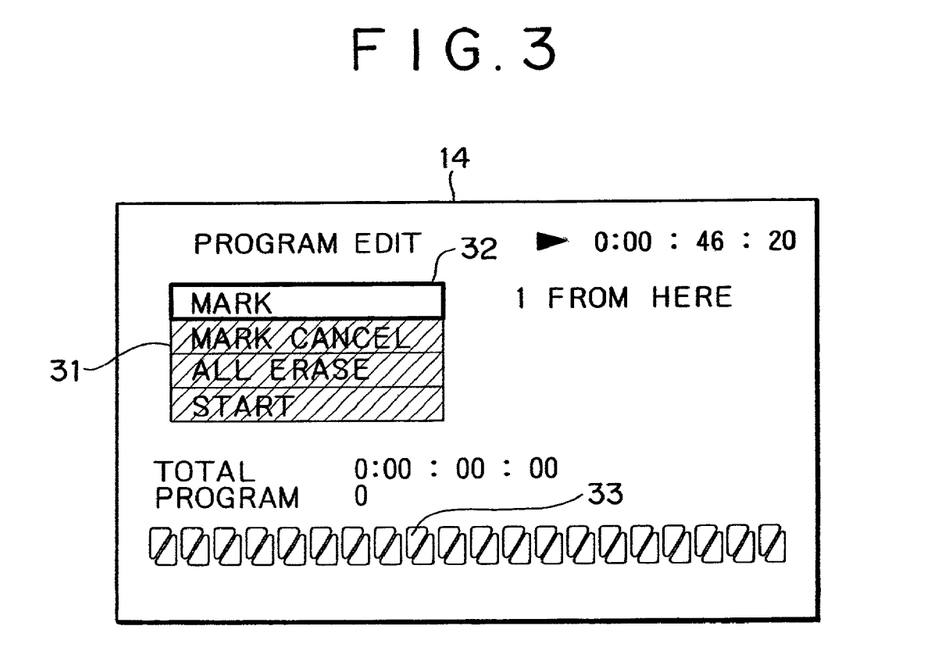

Then the user decides an IN point of the desired video data to be used for editing at a predetermined position with reference to the picture (FIG. 2) reproduced on the LCD panel 14. For example, when the video data from time 0:00:46:20 is to be edited as shown in FIG. 3, the user manipulates (depresses) a button on the input unit 1 to thereby set the IN point of program 1. In response to a mark command received from the user, the microprocessor 2 stores the IN point of program 1 in the buffer memory, and then displays a new program edit screen on the LCD panel 14. A program edit screen such as that shown in FIG. 4, for example, is displayed.

Figure 4:
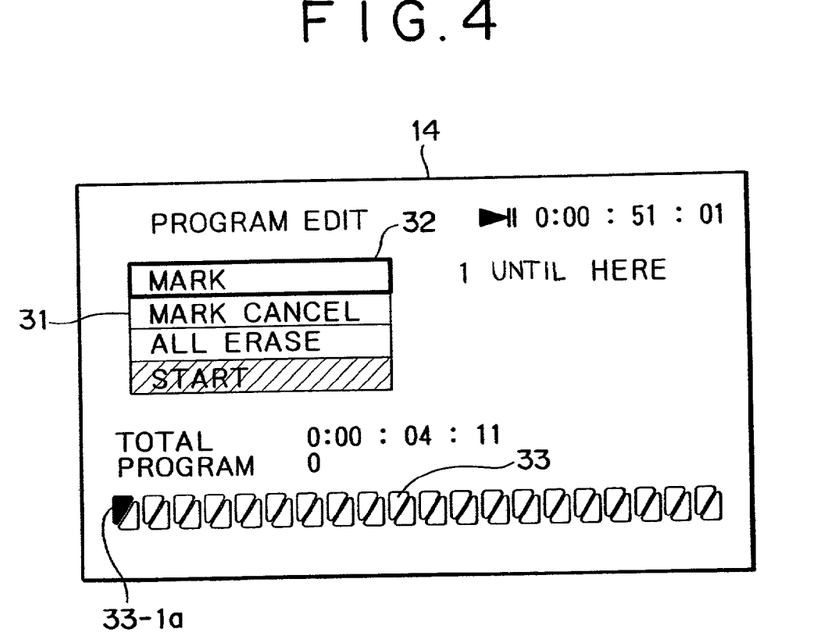

In the example of FIG. 4 where the IN point of one program (program 1 in this case) has been set by the user, the mark 33-1a out of the entire twenty marks 33 is displayed in blue, and, other than "Start," any of the modes in the edit mode display area 31 are rendered selectable. The total time 0:00:04:11 (elapsed time from the IN point set by the user) of the program is displayed, and further "1 Until here" is also displayed, hence prompting the user to set an OUT point for program 1.

In the edit mode of the edit mode display area 31, if the user manipulates the input unit 1 to input an execution command while moving the cursor 32 to the position of "Mark cancel" or "All erase", then it is possible to return the display to the former program edit screen shown in FIG. 2.

Further, the user decides an OUT point of the desired video data to be used for editing at a predetermined position with reference to the picture (FIG. 4) reproduced on the LCD panel 14. For example, when video data until time 0:00:51:01 is to be edited, as shown in FIG. 4, the user manipulates a button of the input unit 1 to thereby decide the OUT point for program 1. In response to a mark command received from the user, the microprocessor 2 stores the OUT point for program 1 in the buffer memory, and then displays a new program edit screen on the LCD panel 14. A program edit screen such as that shown in FIG. 5, for example, is displayed.

Figure 5:
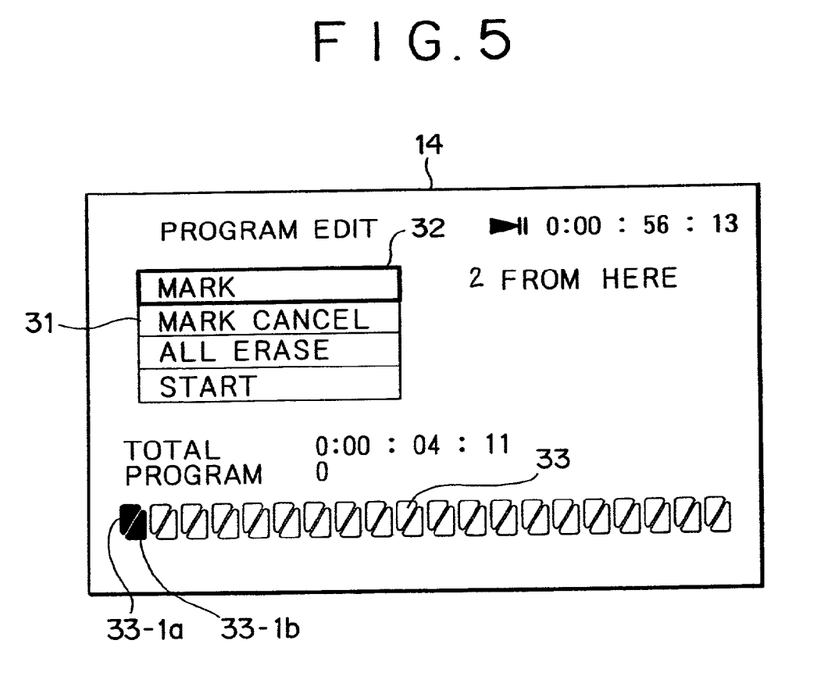

In the example of FIG. 5 where the OUT point of one program (program 1 in this case) has been set by the user, the mark 33-1b out of the entire twenty marks 33 is displayed in blue. The mark 33-1a is already displayed in blue.

When the IN and OUT points of program 1 have thus been set by the processing mentioned above, the "Start" mode that previously had been unselectable is rendered selectable to thereby enable execution of the editing process. In FIG. 5, for example, if the user manipulates the input unit 1 in the edit mode of the edit mode display area 31 to input an execution command by positioning the cursor 32 on "Start", then editing is started from the IN point (mark 33-1a) to the OUT point (mark 33-1b) of the program information stored in the buffer memory of the microprocessor 2.

Once the OUT point of program 1 has been set, "2 From here" is displayed, as shown in FIG. 5, for prompting the user to set the IN point of program 2. Once the program information for program 2 has been set, the user may set the program information for the remainder of the programs. After all of the program information has been set, the user can start the editing process by positioning the cursor 32 on "Start" in the edit mode display area 31 and inputting an execution command.

Next, with reference to the program edit screens of FIGS. 6 to 8, an explanation will be given of an editing process executed in accordance with the program information set by the processing mentioned above. It is assumed here that the program information (programs 1 to 5) have already been set and stored in the buffer memory of the microprocessor 2. Although not shown, marks 33-1a to 33-5a and marks 33-1b to 33-5b are displayed in blue. And a D-VHS tape is loaded in the D-VHS 18, which is held on standby in a recording pause mode.

Figure 6:
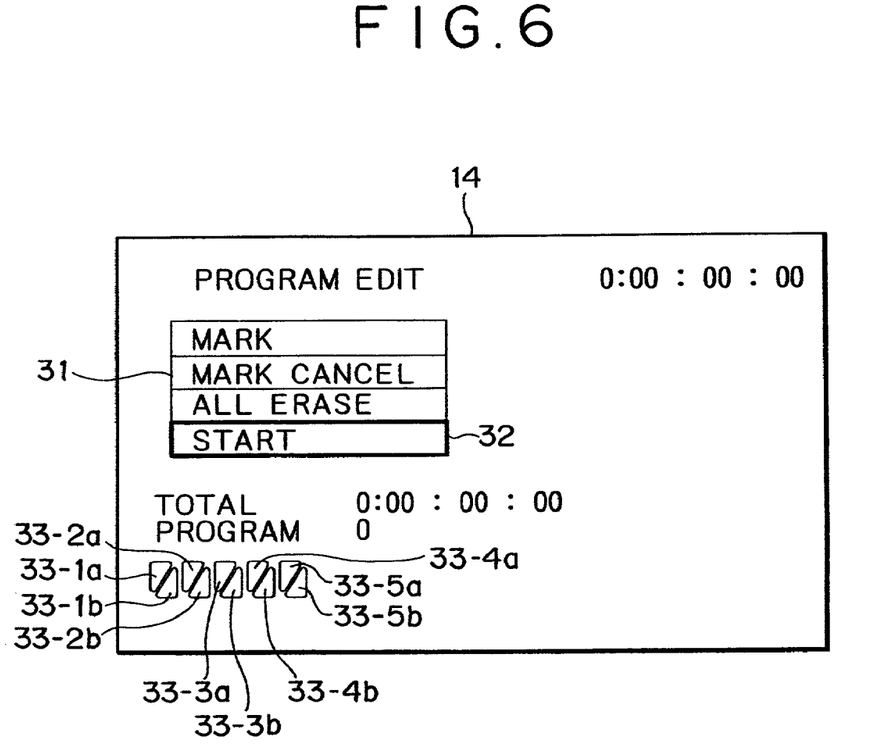

The example of FIG. 6 represents a program edit screen immediately after the user manipulates the input unit 1 to input an execution command by positioning the cursor 32 on "Start" in the edit mode display area 31. More specifically, when the program information has been set as mentioned, the marks 33-1a to 33-5a and the marks 33-1b to 33-5b of the programs already set are displayed in blue. Upon execution of the editing process by the user, the microprocessor 2 displays a new program edit screen on the LCD panel 14 in response to the command input by the user (i.e., the marks 33-1a to 33-5a and 33-1b to 33-5b displayed in blue are changed to white).

Upon start of the editing process, the microprocessor 2 controls the reproducing circuit 11 to read out the video data recorded on the recording medium 10, and then outputs the video data to the D-VHS 18 via the AV cable.

In accordance with the program information read out from the buffer memory, the microprocessor 2 issues a remote control command to the IR commander 5 to release the D-VHS 18 from the recording pause mode upon reaching the IN point of program 1 (time 00:00:46:20 in this case) set by the user, and then an IR signal is output from an infrared emitter (not shown) of the IR commander 5. The D-VHS 18 receives the recording pause release command from the IR commander 5 and enables the D-VHS 18 to start recording the video data, which is supplied via the AV cable, onto the loaded D-VHS tape.

Figure 7:
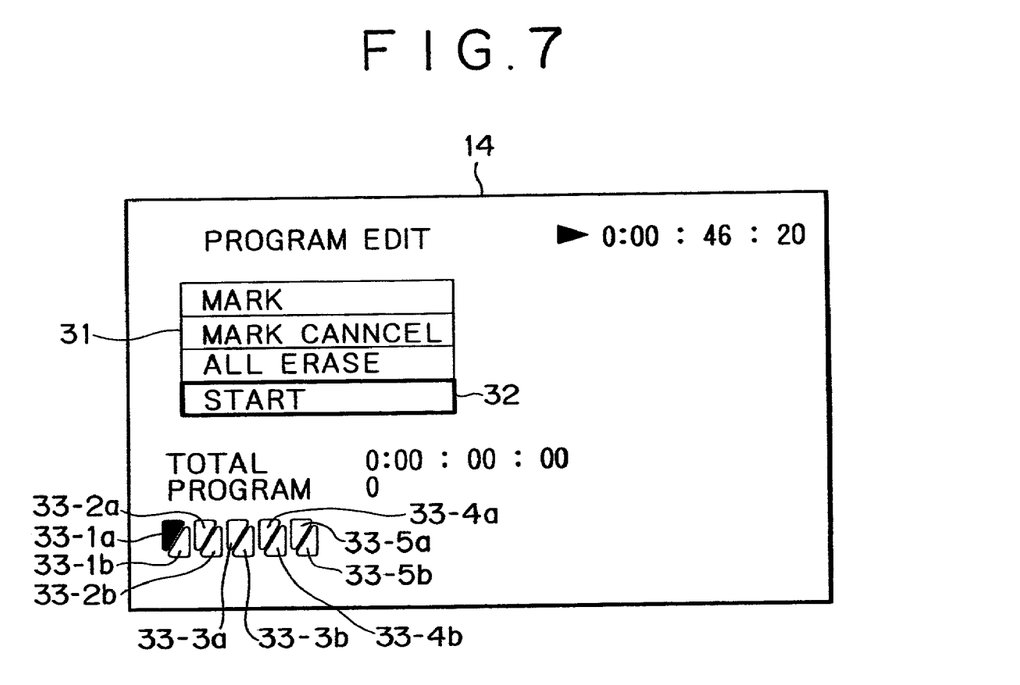

Further, the microprocessor 2 displays, in response to the command from the user, a new program edit screen on the LCD panel 14, whereby a program edit screen, such as that shown in FIG. 7, for example, is displayed.

The example of FIG. 7 represents a program edit screen displayed during the period of recording program 1. In this case, the displayed mark 33-1a indicating the recording of program 1 is changed in color from white to blue.

In accordance with the program information read out from the buffer memory, the microprocessor 2 issues a remote control command to the IR commander 5 to place the D-VHS 18 in the recording pause mode upon reaching the OUT point of program 1 (time 00:00:51:01 in this case) set by the user, and then an IR signal is output from the infrared emitter of the IR commander 5. The D-VHS 18 receives the recording pause command from the IR commander 5, and pauses the recording of the video data on the D-VHS tape.

Figure 8:
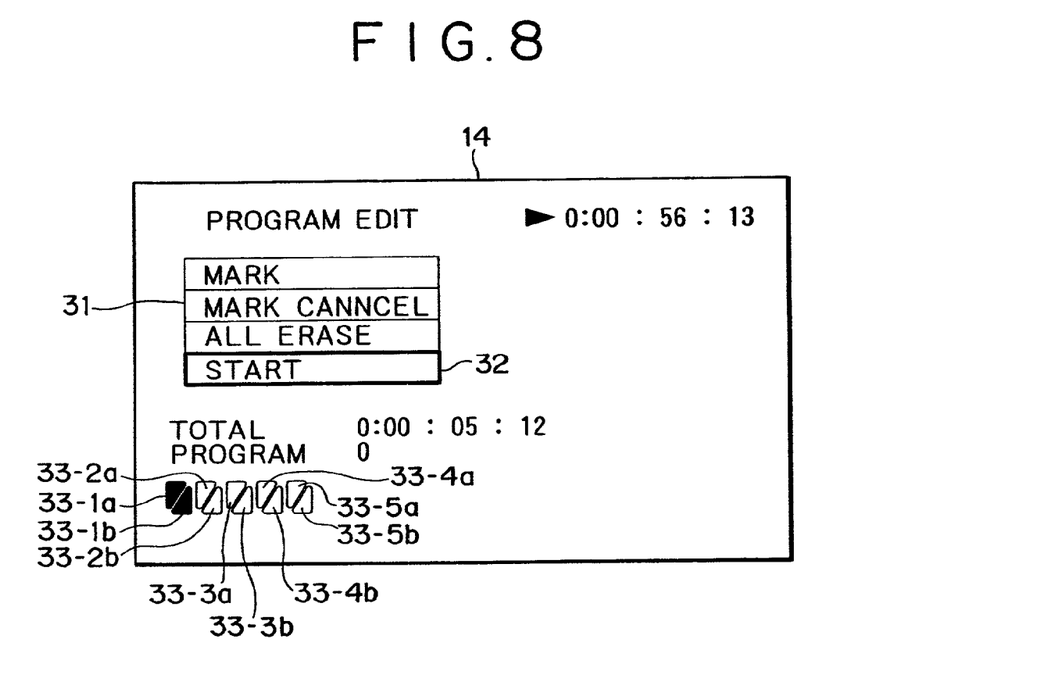

Further, the microprocessor 2 displays, in response to the command from the user, a new program edit screen on the LCD panel 14, whereby a program edit screen, such as that shown in FIG. 8, for example, is displayed.

The example of FIG. 8 represents a program edit screen displayed after the recording of program 1 has terminated. In this case, the displayed mark 33-1b is changed in color from white to blue so as to indicate the termination of recording of program 1.

In accordance with the program information read out from the buffer memory, the microprocessor 2 sends a recording pause release command to the D-VHS 18 upon reaching the IN point of program 2 set by the user, thereby recording the video data again on the D-VHS tape. Subsequently, upon reaching the OUT point of program 2, the microprocessor 2 sends a recording pause command to the D-VHS 18 to thereby pause the data recording on the D-VHS tape. The editing process described above is executed in a similar manner with regard to each of the programs 3 to 5.

In response to the command received from the DVTR, the D-VHS 18 releases the recording pause or pauses the video data recording. However, there occurs a time lag between the reception of the recording pause release command and the actual start of recording.

Figure 9:
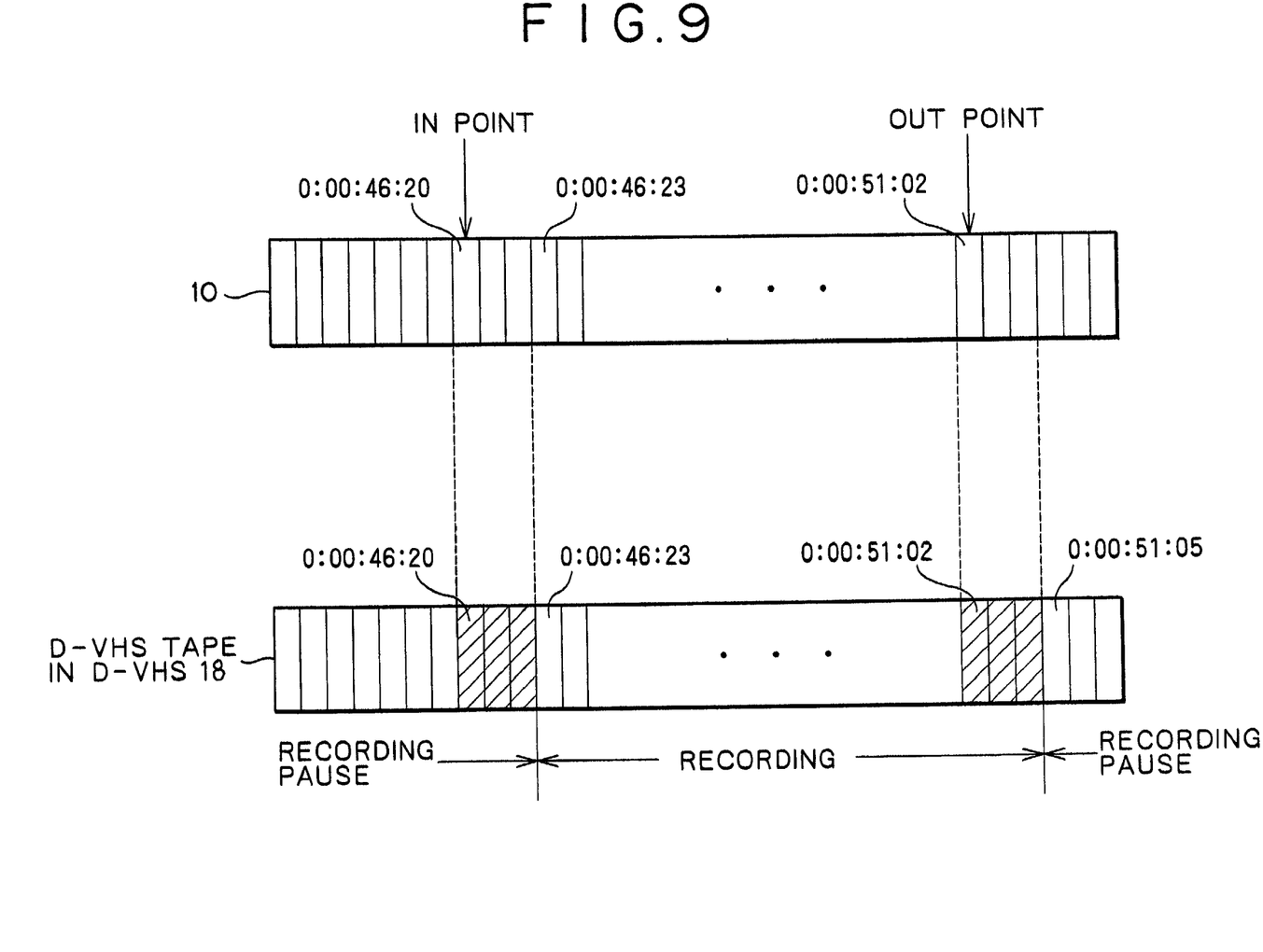
FIG. 9 is an explanatory diagram showing a recording lag.

More specifically, as shown in FIG. 9, the DVTR sends a recording pause release command to the D-VHS 18 upon reaching the IN point (time 0:00:46:20 in the example of FIG. 9) of the program read out from the buffer memory. After receiving the command from the DVTR, the D-VHS 18 releases the recording pause and then records the video data on the loaded D-VHS tape. Actually, however, the recording is started with a delay from the IN point set by the user (with a delay of three frames in the example of FIG. 9), i.e., the recording is started at time 0:00:46:23. Similarly, upon reaching the OUT point (time 0:00:51:02), a recording pause command is sent from the DVTR to the D-VHS 18, but the recording is actually paused after a delay of three frames (i.e., recording takes place until time 0:00:51:05 and is then paused).

Prior to the start of the editing process, frame counter information obtained from the on-screen display circuit 6 is output to the D-VHS 18 via the line output terminal 15 and is recorded in the D-VHS 18. Subsequently, the user performs dummy editing on the D-VHS tape using invalid data and displays, for confirmation on the monitor, the lag (delay) between the frame counter at the set IN point and the frame counter actually recorded on the D-VHS tape. Thereafter the user calculates the offset (three frames in this case) of the frame counter displayed on the monitor, and then stores it in the microprocessor 2. As a result, the DVTR is able to send a recording pause release command to the D-VHS 18 at a time three frames before the IN point set by the user, and a recording pause command at a time three frames before the OUT point set by the user.

Figure 10:
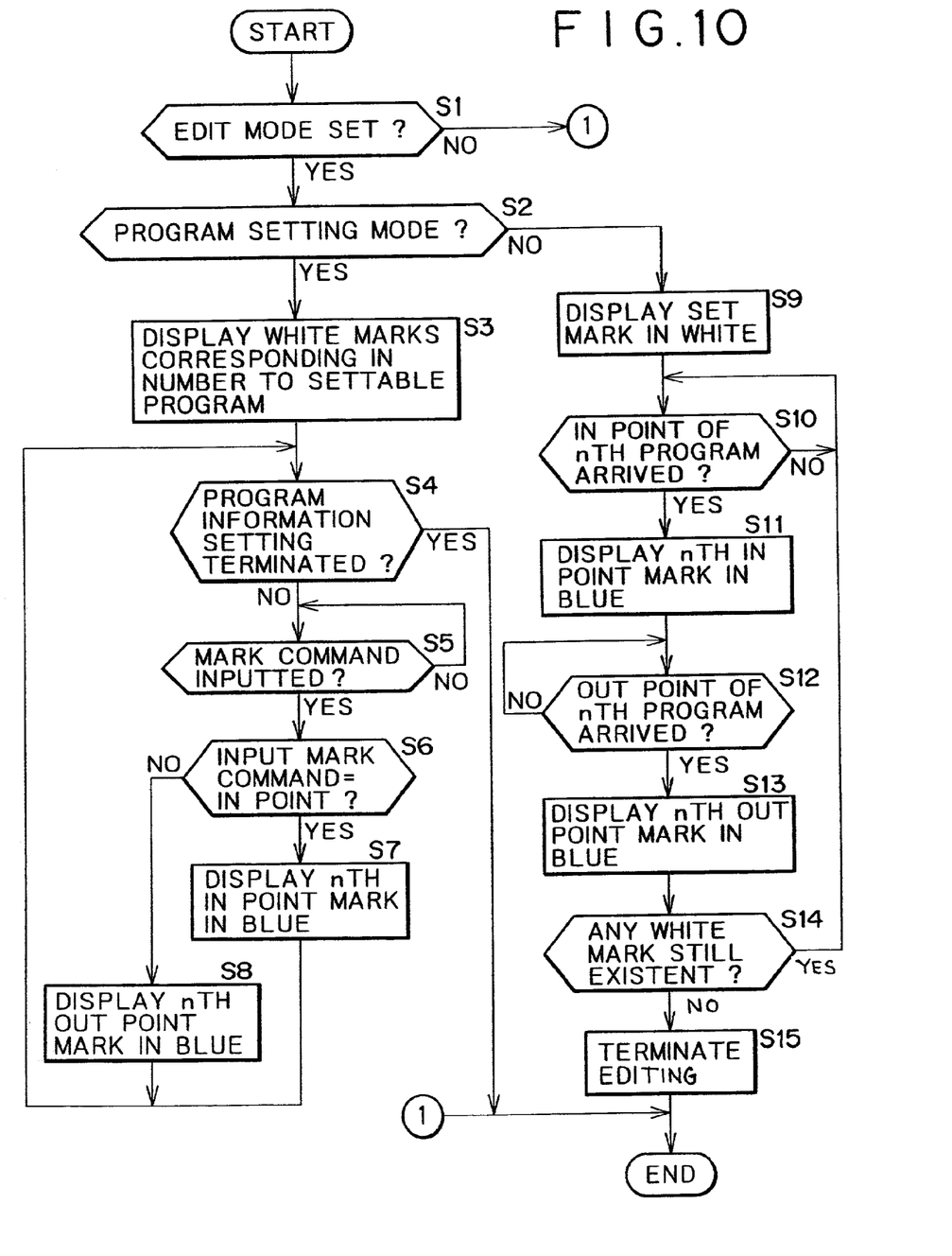
FIG. 10 is a flowchart of a processing routine to set program information and edit video data.

A processing routine to be executed by the microprocessor 2 for setting the program information and editing the video data will be explained below with reference to the flowchart of FIG. 10. This processing routine begins when the user manipulates the input unit 1 to input a command to start the program information setting or the video data editing.

At step S1, the microprocessor 2 controls the reproducing circuit 11 in response to a command from the user, and causes the circuit 11 to read out the video data recorded on the recording medium 10. Subsequently, the microprocessor 2 makes a decision as to whether an edit mode has been set in the video data thus read out, i.e., whether PICT_INDE_EDIT has been recorded at the top of the video data read out. If the result of this decision indicates that an edit mode has not been set in the video data, the routine is terminated.

Meanwhile, if the result of the decision at step S1 indicates that an edit mode has been set in the video data, the operation proceeds to step S2, where the microprocessor 2 makes a decision as to whether the relevant mode is a program setting mode. If the result of this decision indicates a program setting mode, the operation proceeds to step S3, where the microprocessor 2 outputs the video data to the LCD panel 14 to display a program edit screen, such as that shown in FIG. 2. At this time, the marks 33 corresponding in number to the settable programs are displayed in white.

At step S4, the microprocessor 2 makes a decision as to whether program setting by the user has been terminated, i.e., whether a program information terminating command has been input by the user's manipulation of the input unit 1. If the result of this decision indicates the termination of program setting, the processing routine is completed. On the other hand, if the result of the decision at step S4 indicates that program setting has not been terminated, the operation proceeds to step S5.

At step S5, the microprocessor 2 makes a decision as to whether a mark command has been input, i.e., whether an IN point or an OUT point of the program has been set by the user's manipulation of the input unit 1. If the result of this decision is negative, indicating that a mark command has not been input, the operation is kept on standby until the result of the decision at step S5 indicates the input of a mark command.

If the result of the decision at step S5 indicates the input of a mark command, the operation proceeds to step S6, where the microprocessor 2 makes a decision as to whether the input mark command is the nth IN point. If the result of this decision indicates that the input mark command is the nth IN point, the operation proceeds to step S7. Subsequently at step S7, the microprocessor 2 stores in the buffer memory the IN point of the nth program input at step S5, and displays in blue (FIG. 4) on the program edit screen being displayed on the LCD panel 14 the IN point mark (33-1a in this case) of the nth program. Thereafter, the operation returns to step S4, and the processing described above is repeated.

If the result of the decision at step S6 indicates that the input mark command is not the nth IN point, i.e., the input command is the nth OUT point, then the operation proceeds to step S8, where the microprocessor 2 stores in the buffer memory the OUT point of the nth program input at step S5, and displays in blue (FIG. 5) on the program edit screen being displayed on the LCD panel 14 the OUT point mark (33-1b in this case) of the nth program. Thereafter, the operation returns to step S4, and the processing described above is repeated.

If the result of the decision at step S2 indicates that the relevant mode is not a program setting mode, i.e., when the program information has already been set, the operation proceeds to step S9, where the microprocessor 2 displays the set marks 33 in white (FIG. 6) on the program edit screen being displayed on the LCD panel 14, indicating that the program information has already been set. At this time, the microprocessor 2 controls the reproducing circuit 11 to read out the video data recorded on the recording medium 10, and then outputs the video data to the D-VHS 18 via the AV cable.

At step S10, the microprocessor 2 makes a decision in accordance with the program information read out from the buffer memory as to whether the IN point of the nth program has been reached. If the result of this decision is negative, indicating that the IN point of the nth program has not yet been reached, the operation is kept on standby at step S10 until the result of the decision indicates that the IN point of the nth program has been reached.

If the result of the decision at step S10 indicates that the IN point of the nth program has been reached, the operation proceeds to step S11, where the microprocessor 2 sends a recording pause release command to the D-VHS 18 to thereby start recording of the video data on the D-VHS tape, and then displays in blue (FIG. 7) on the program edit screen the IN point mark (33-1a in this case) of the nth program.

At step S12, the microprocessor 2 makes a decision in accordance with the program information read out from the buffer memory as to whether the OUT point of the nth program has been reached. If the result of this decision is negative, indicating that the OUT point of the nth program has not yet been reached, the operation is kept on standby at step S12 until the result of the decision indicates that the OUT point of the nth program has been reached. During this time, the D-VHS 18 keeps recording the data.

If the result of the decision at step S12 indicates that the OUT point of the nth program has been reached, the operation proceeds to step S13, where the microprocessor 2 sends a recording pause command to the D-VHS 18 to thereby pause recording of the reproduced data on the D-VHS tape, and then displays in blue (FIG. 8) on the program edit screen the OUT point mark (33-1b in this case) of the nth program.

At step S14, the microprocessor 2 makes a decision as to whether any white marks (33-2a to 33-5a and 33-2b to 33-5b in the example of FIG. 8) still exist out of all the program information set marks 33 (33-1a to 33-5a and 33-1b to 33-5b in the example of FIG. 8) displayed on the LCD panel 14. If the result of this decision indicates that some white marks still exist, the operation returns to step S10, and the subsequent processing described above is repeated.

If the result of the decision at step S14 indicates that no white marks exist, the operation proceeds to step S15, where the microprocessor 2 determines that the editing has been terminated, and the processing routine is completed.

As described above, the microprocessor 2 stores in the buffer memory the program information set by the user, and simultaneously displays the marks 33 corresponding to the program on the LCD panel 14, thereby enabling the user to recognize the set information in a short time and also to perform the editing work easily using the marks 33.

In any of the embodiments mentioned, the marks 33 indicating the set program information are displayed in blue, while the other marks 33 indicating the unfinished editing work are displayed in white. However, the present invention is not limited to such examples alone, and any other color may be used as well. Additionally, the marks corresponding to the program being edited may be displayed in a blinking fashion or in a different shape.

Further, although the above embodiments describe twenty programs which may be set at a time, this number may be selectively changed by the user.

The processing routine described above is executable by software as well as by hardware. In case the routine is executed by software, programs constituting the software are installed in a computer incorporated in exclusive hardware, or are installed from a recording medium into a general purpose personal computer or the like which is capable of executing various functions through installation of various programs.

As shown in FIG. 1, the recording medium may comprise packaged media distributed for providing programs to the user separately from the computer, such as a magnetic disk 101 (including floppy disk), an optical disk 102 (including CD-ROM (Compact Disk-Read Only Memory), DVD (Digital Versatile Disk)), a magneto-optical disk 103 (including MD (Mini-Disk)), or a semiconductor memory 104 where the programs are recorded. In addition, the recording medium may comprise a program-recorded microprocessor 2, a hard disk drive and so forth previously integrated into the computer.

In this specification, the steps that describe the program recorded in the recording medium include the processes executed in time series in the prescribed order and also those executed in parallel or individually without such time-series processing.

Thus, according to the information reproducing apparatus, the image display control method and the program recorded in the recording medium of the present invention, it is possible for the user to easily perform a video data editing process by reproducing the image signals recorded on the recording medium, setting at least one or more start and end points for editing the image signals recorded on the recording medium, storing one or more image signal start and end points set in this manner, and displaying marks which correspond to such stored image signal start and end points.

What is claimed is:

1. An information reproducing apparatus, comprising:
   a reproducing device operable to reproduce image signals recorded on a recording medium;
   a setting unit operable to set at least one image signal start point and end point for editing said recorded image signals;
   a storage device operable to store said at least one image signal start point and end point set by said setting unit; and
   a controller operable to control the display of marks corresponding to said stored image signal start points and end points;
   whereby said controller controls the display of a menu of editing commands and an indication of available commands from among said editing commands, said available commands being determined according to the state of said stored image signal start points and end points.

2. The information reproducing apparatus according to claim 1, wherein said storage device is operable to store a selected number of image signal start points and end points, and said controller is operable to control the display of marks so that marks corresponding in number to said selected number are displayed.

3. The information reproducing apparatus according to claim 2, wherein said selected number of image signal start points and end points includes said stored image signal start points and end points and unstored image signal start points and end points, and said controller is operable to control the display of marks so that said marks corresponding to said stored image signal start points and end points are displayed in a first color, and marks corresponding to said unstored image signal start points and end points are displayed in a color different from said first color.

4. The information reproducing apparatus according to claim 1, wherein said controller is operable to control the display of marks so that ones of said marks corresponding to said stored image signal start points and end points representing said recorded image signals which have been reproduced by said reproducing device are displayed in a first color, and others of said marks corresponding to said stored image signal start points and end points representing said recorded image signals which have not yet been reproduced by said reproducing device are displayed in a color different from said first color.

5. An image display control method, comprising
reproducing image signals recorded on a recording medium;
setting at least one image signal start point and end point for editing said recorded image signals;
storing said at least one image signal start point and end point; and
displaying marks corresponding to said stored image signal start points and end points;
whereby a nemu of editing commands is displayed and an indication of available commands from among said editing commands is also displayed, said available commands being determined according to the state of said stored image signal start points and end points.

6. The image display control method according to claim 5, wherein said storing step includes storing a selected number of image signal start points and end points, and said displaying step includes displaying marks corresponding in number to said selected number.

7. The image display control method according to claim 6, wherein said selected number of image signal start points and end points includes said stored image signal start points and end points and unstored image signal start points and end points, and said displaying step includes displaying said marks corresponding to said stored image signal start points and end points in a first color, and displaying marks corresponding to said unstored image signal start points and end points in a color different from said first color.

8. The image display control method according to claim 5, wherein said displaying step includes displaying ones of said marks corresponding to said stored image signal start points and end points representing said recorded image signals which have been reproduced in said reproducing step in a first color, and displaying others of said marks corresponding to said stored image signal start points and end points representing said recorded image signals which have not yet been reproduced in said reproducing step in a color different from said first color.

9. A storage medium recorded with a computer-readable program, said program comprising
reproducing image signals recorded on a recording medium;
setting at least one image signal start point and end point for editing said recorded image signals;
storing said at least one image signal start point and end point; and
displaying marks corresponding to said stored image signal start points and end points;
whereby a nemu of editing commands is displayed and an indication of available commands from among said editing commands is also displayed, said available commands being determined according to the state of said stored image signal start points and end points.

10. An information processing apparatus, comprising:
a manipulating device operable to manipulate data recorded on a recording medium;
a setting unit operable to set at least one parameter for manipulating data;
a storage device operable to store at least one parameter set by said setting unit; and
a controller operable to control the display of marks corresponding to said stored parameter;
whereby said controller controls the display of a menu of manipulation commands and an indication of available commands from among said manipulation commands, said available commands being determined according to the state of said stored parameter.

11. A data display control method, comprising the steps of:
manipulating data recorded on a recording medium;
setting at least one parameter for manipulating data;
storing said at least one parameter set in said setting step; and
displaying marks corresponding to said stored parameter;
whereby a menu of manipulation commands is displayed and an indication of available commands from among said manipulation commands is also displayed, said available commands being determined according to the state of said stored parameter.

12. A storage medium recorded with a computer-readable program for performing a data display control method, said method comprising the steps of:
manipulating data recorded on a recording medium;
setting at least one parameter for manipulating data;
storing said at least one parameter set in said setting step; and
displaying marks corresponding to said stored parameter;
whereby a menu of manipulation commands is displayed and an indication of available commands from among said manipulation commands is also displayed, said available commands being determined according to the state of said stored parameter.

* * * * *

UNITED STATES PATENT AND TRADEMARK OFFICE
CERTIFICATE OF CORRECTION

PATENT NO. : 6,983,099 B2
APPLICATION NO. : 09/808852
DATED : January 3, 2006
INVENTOR(S) : Hiroki Tanaka and Katsuhiro Sugiyama

Page 1 of 1

It is certified that error appears in the above-identified patent and that said Letters Patent is hereby corrected as shown below:

Column 12,
Line 11, delete "nemu" and insert -- menu --.

Signed and Sealed this

Twenty-seventh Day of June, 2006

JON W. DUDAS
*Director of the United States Patent and Trademark Office*